June 26, 1962 A. M. NELSON ETAL 3,041,066
CARD PROCESSING APPARATUS
Filed Oct. 14, 1958 7 Sheets-Sheet 1

INVENTORS:
Alfred M. Nelson
Hans M. Stern
Donald H. Westermeier

By Smyth & Roston
Attorneys

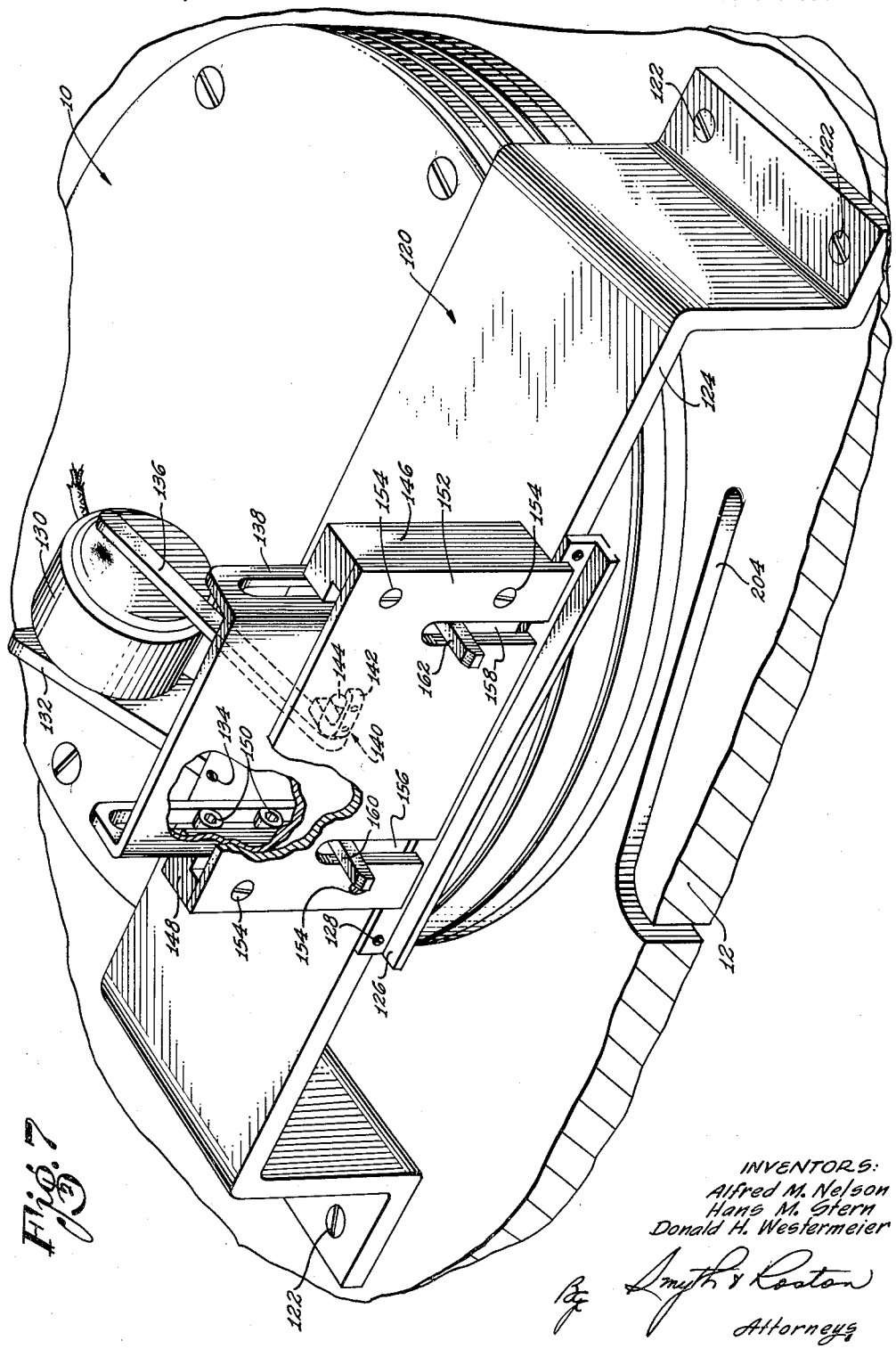

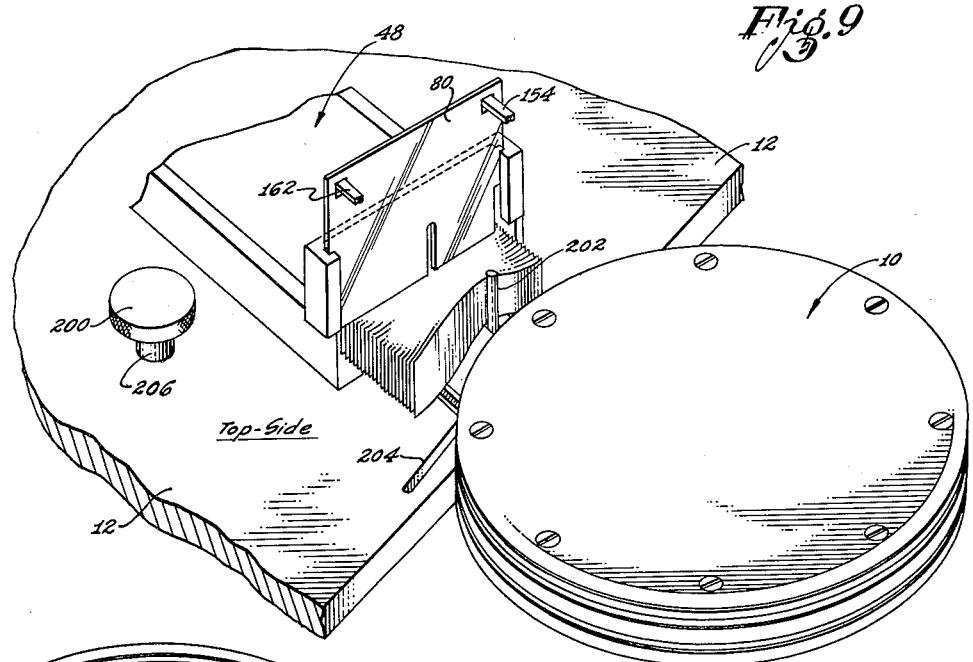
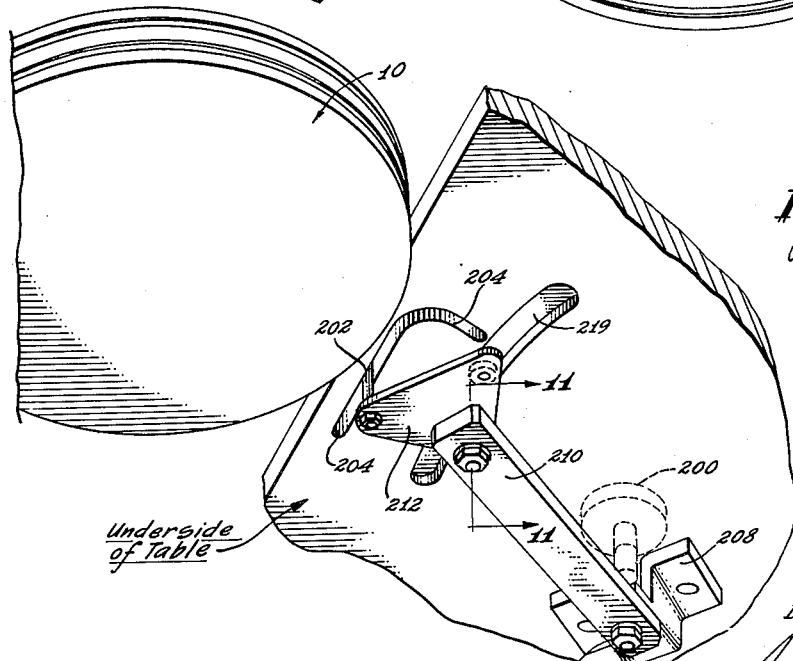

3,041,066
CARD PROCESSING APPARATUS
Alfred M. Nelson, Redondo Beach, Hans M. Stern, Culver City, and Donald H. Westermeier, North Hollywood, Calif., assignors to Magnavox Company, Los Angeles, Calif., a corporation of Delaware
Filed Oct. 14, 1958, Ser. No. 767,132
33 Claims. (Cl. 271—5)

This invention relates to information storage card processing apparatus, and the invention relates more particularly to an improved card holding station for use in such apparatus.

The invention is primarily concerned with an improved card holding station which cooperates with the other components of the card processing apparatus and which holds the cards in a stacked condition to be controllably fed to a transporting medium of the apparatus or removed from the transporting medium. The card holding station to which the present invention is directed is of the magazine type in which the cards in the station are stacked in a removable magazine.

In one type of data processing system, information is stored in digital form on a plurality of separate cards. Each of the cards is provided with a number of positions, each of which for example is capable of storing a multidigit binary number. The information may be stored in the form of discrete magnetic areas of one polarity or the other, as is the case with the embodiment of the invention which will be described. Alternately, the information may be stored in the form of hole patterns in the cards, in the form of photographic representations, or in any other appropriate form. It will be appreciated that for these various recording forms, it is merely necessary that the apparatus include appropriate transducers for transforming the information into electrical signals and vice versa.

A large number of information storage cards of the type discussed in the preceding paragraph are often required in complex data processing systems. This is because millions of bits of binary data are required to represent the information stored in such systems. It is most essential, therefore, in such systems to provide some means for storing the cards in a manner in which they may be quickly and conveniently fed to the processing apparatus.

In one type of prior art apparatus, for example, the information storage cards are maintained in stacked relationship in a card holding station, and the cards in the holding station are controllably fed in succession from the station to an appropriate transporting medium. The cards are then carried by the transporting medium in the prior art apparatus past a transducer station at which the information on the cards is read and transformed into electrical signals, or at which new information is written on the cards. Upon the completion of the processing operation by the prior art apparatus, the cards are returned to, and restacked in, either the same or different card holding stations.

To provide flexibility in the card processing apparatus of the type under discussion, it is preferable that the card holding stations be of the reversible type. That is, each of the card holding stations should be capable of operating in a first mode in which cards may be controllably fed from the station in sequence to a transporting medium, and of operating in a second mode in which cards may be removed from the transporting medium and deposited in the card holding station. Such reversible card holding stations are described and claimed, for example, in copending application 538,111, filed October 3, 1955, in the name of Robert M. Hayes (now Patent No. 2,842,362), and in copending application 645,639, filed March 12, 1957, in the name of Alfred M. Nelson et al. (now Patent No. 2,969,979).

A certain problem may sometimes be encountered in the reversible card holding stations discussed above and in other types of card holding stations associated with the card processing apparatus. This problem relates to the provision of a convenient means for inserting a stack of cards into the card holding station and for permitting the convenient removal of the stack of cards from the card holding station for storage in a separate storage area.

The large number of cards involved in the more complex card processing system, referred to above, usually requires that the cards not actually being processed be stored in a separate area. Then, when any particular group of cards is to be processed, that group is removed from the storage area and inserted in one of the card holding stations of the card processing apparatus. The cards in the group may then be successively fed into the apparatus.

Copending application 685,539, filed September 23, 1957, in the name of Allan Orner (now Patent No. 2,901,247), discloses and claims an improved card processing apparatus in which the different groups of cards are held in individual magazines, with each magazine holding its group in a stacked condition. These magazines can conveniently be stored in a separate storage area. Then, the magazines may be individually removed from the storage area and placed in a card holding station of the card processing apparatus whenever a desired card is to be processed.

The improved card processing apparatus of the copending application 685,539 (now Patent No. 2,901,-247) is constructed so that a selected magazine of cards may be quickly snapped into place in a card holding station in a position to permit the cards immediately to be fed sequentially into the card processing apparatus. The construction of the apparatus of the copending application is such that the magazine can be inserted and withdrawn from the card holding station without interfering in any manner with the card transfer control components or with any of the other components of the card holding station.

The present invention is also directed to improved card processing apparatus in which removable magazines can be inserted and withdrawn from the individual card holding stations. The apparatus of the present invention fulfills the objectives of the apparatus of the copending application 685,539 (now Patent No. 2,901,247) and achieves these objectives in a straightforward manner and by means of relatively simple structural components.

In the embodiment of the invention to be described, the stacks of information storage cards are positively retained in individual magazines, with each magazine being provided with a closure member at its forward end and with a spring-biasing member for urging the stack of cards in the magazine against its closure member.

The magazine in the apparatus of the invention is supported in its card holding station in a position spaced from the transport medium. This is so that the card transfer components of the station, such as a stack head and a feed head which are usually associated with the station, will not be interfered with in any way by the magazine as the station is conditioned between its feeding mode and its stacking mode. This enables the magazine to be constructed without the need for excessively large openings in its sides to receive these heads.

An appropriate mechanism is provided in the card holding station in the apparatus of the invention for opening the closure member of the magazine when the magazine is in place. Then, when the closure member is opened, the biasing means forces the cards out of the forward end of the magazine. A guide member is permanently positioned in the card holding station to guide the stack of cards so pushed out of the magazine into a proper position with the lead card engaging both the feed head and the transport medium. The guide member also serves to define a throat with the transport medium so that only one card at a time can pass from the station to the transport medium.

The card holding station of the present invention also includes a control which serves bodily to move back into the magazine the stack of cards which normally occupy the space between the forward end of the magazine and the transport medium when the magazine is in place. This permits the closure member at the forward end of the magazine to be closed so that the magazine and its stack of cards may be removed from the card holding station.

An important feature of the invention, therefore, is the provision of a card holding station which is constructed to receive a magazine of cards without any interference with the transfer controls of the station, and which magazine can be constructed to almost completely enclose the cards held in it so that there is no danger of the cards inadvertently falling out of the magazine or being damaged.

Another feature of the invention is an improved construction for the card holding station which permits a magazine of cards quickly to be moved into place and which functions to feed cards out of and into the magazine and card holding station smoothly and without any danger of damage to the cards due to misalignments or the like.

Figure 1:
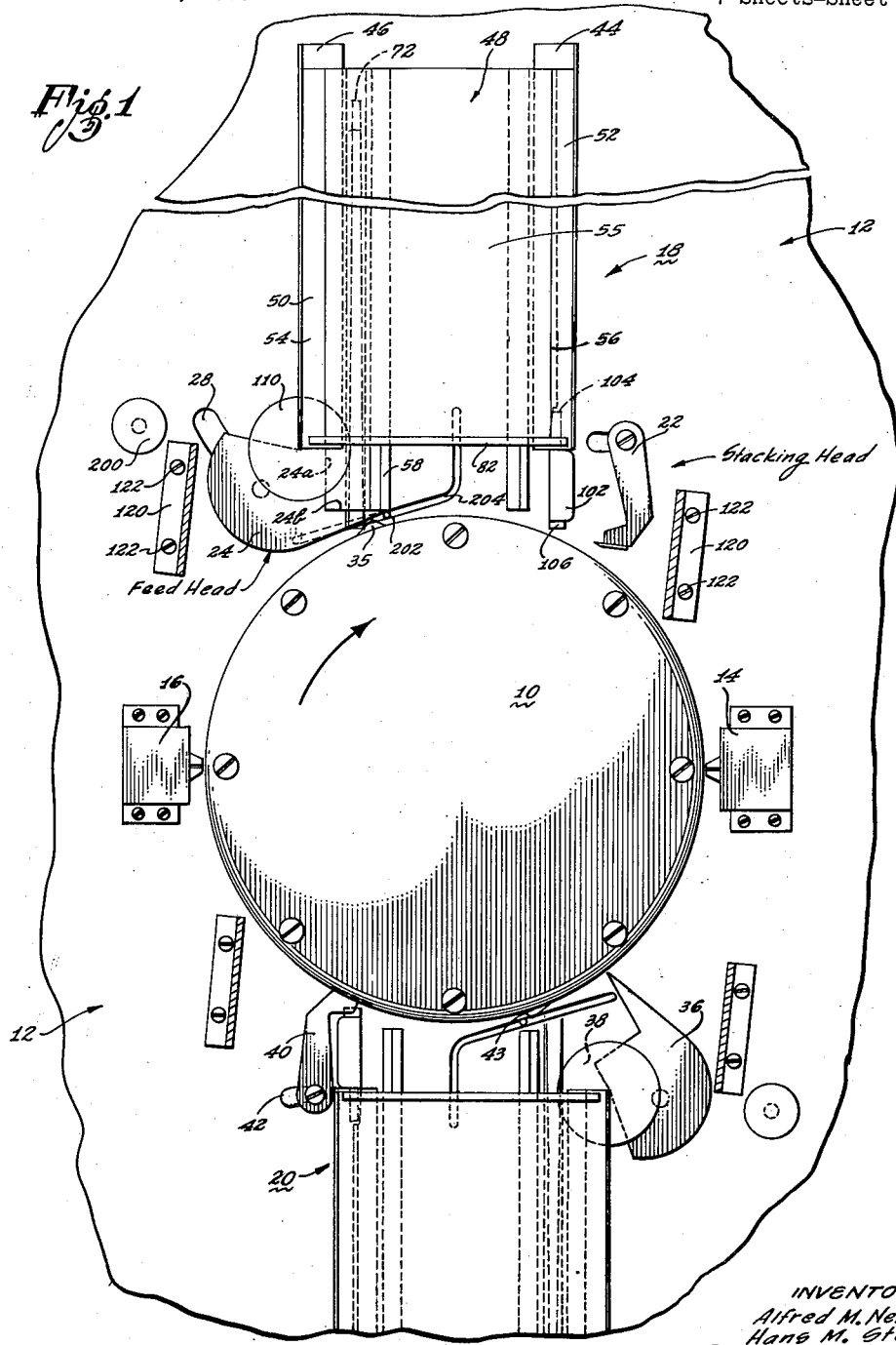
FIGURE 1 is a top plan view of a simplified form of card processing apparatus which is constructed to incorporate the present invention, the illustrated apparatus including a pair of card holding stations constructed in accordance with the invention and disposed adjacent a rotatable drum type of transport medium.
Figure 3:
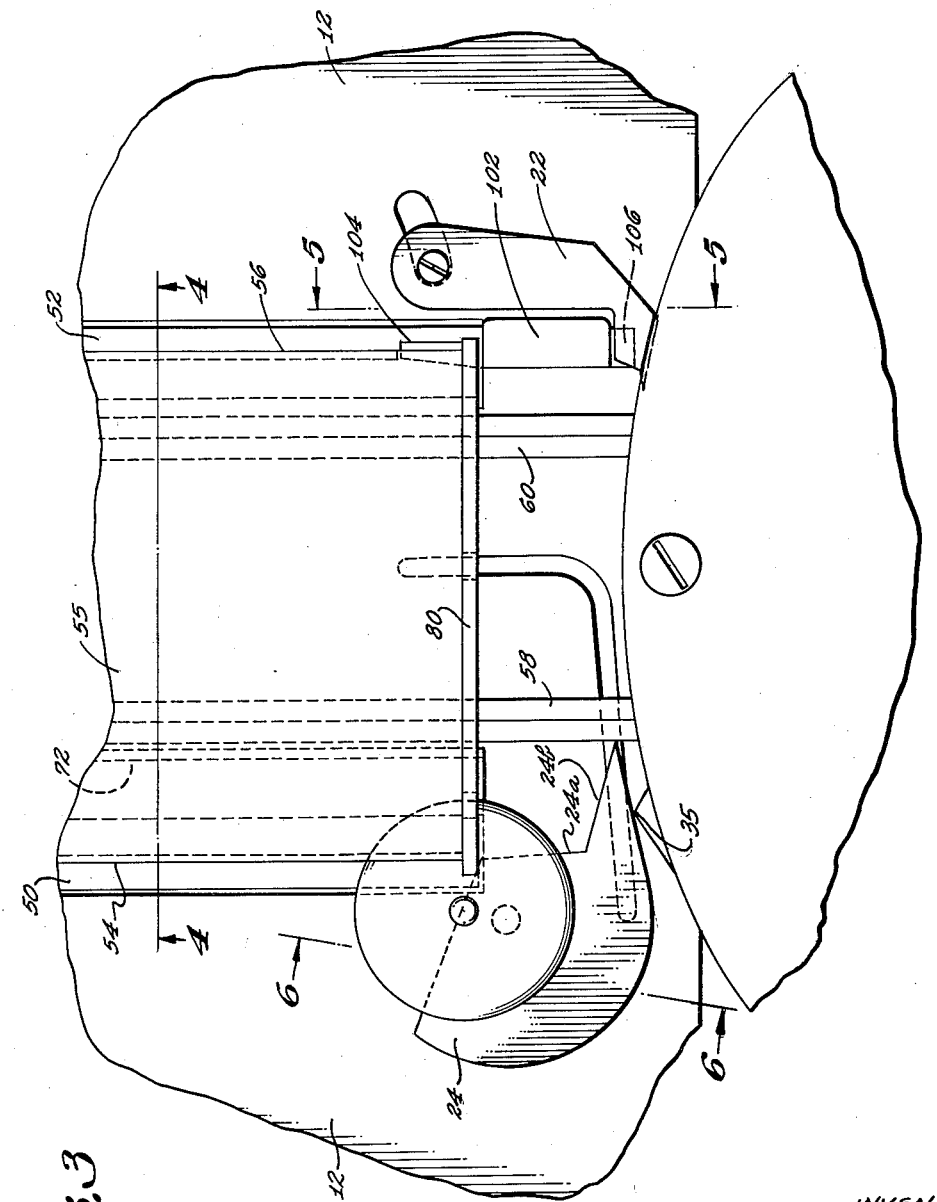
Figure 4:
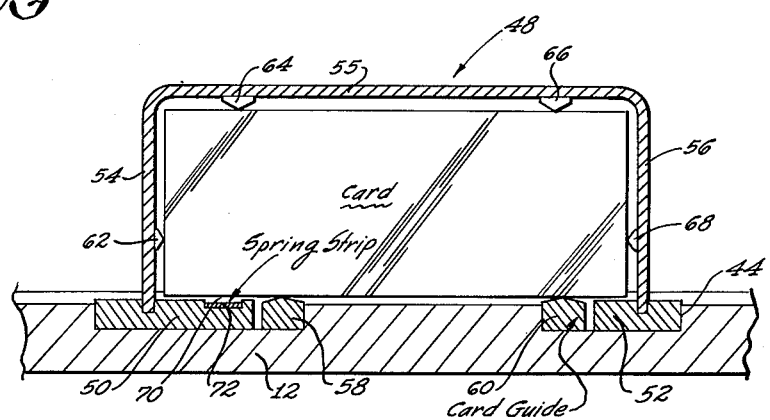
Figure 5:
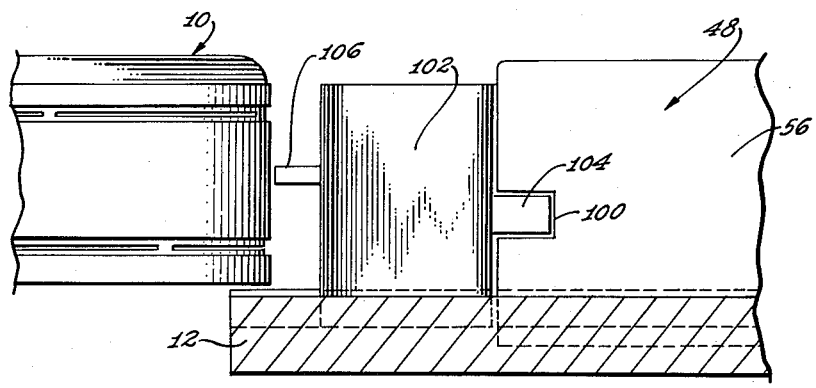
Figure 6:
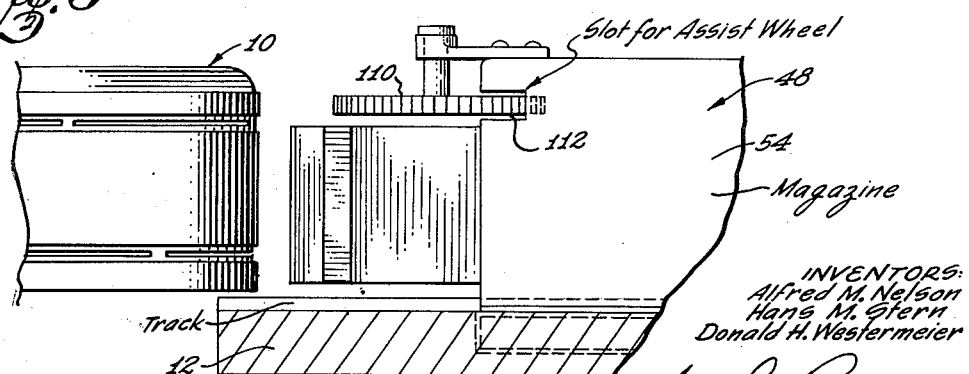
Figure 11:
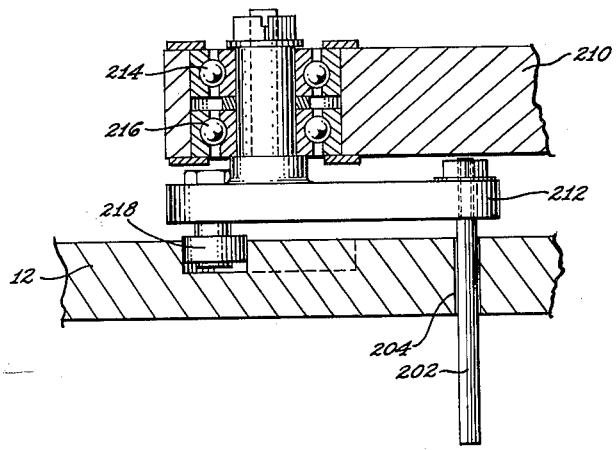
Figure 8:
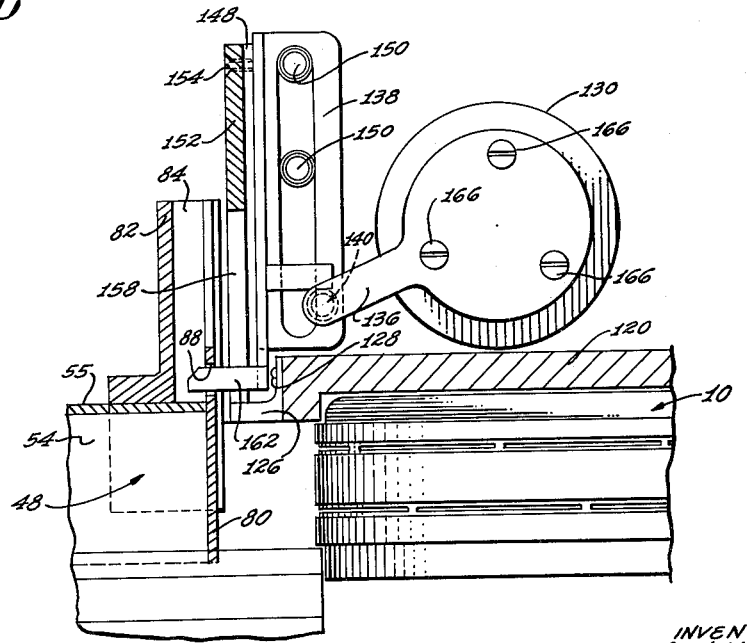

FIGURE 3 is a fragmentary view on an enlarged scale of one of the card holding stations of FIGURE 1, this view showing in detail the configuration of the feed head and stack head of the card holding station, the manner in which the magazine is supported in spaced relation from the transport medium, and the relation between a guide member which serves to guide the cards into the space between the magazine card and the transport medium and to control the feed of cards from the station to the transport medium;

FIGURE 4 is a sectional view substantially on the line 4—4 of FIGURE 3 and illustrating further details of the magazine, this latter view showing a pair of guide rails disposed in the card holding station which serves to guide the cards forwardly from the magazine to the transport medium and vice versa, and this view also showing the manner in which a spring strip is mounted to resiliently bias the cards forwardly in the magazine;

FIGURE 5 is a side elevational view substantially on the line 5—5 of FIGURE 3, this view showing the configuration of the guide member, and the manner in which it extends into a small slot in the magazine and cooperates with the magazine and the transport medium smoothly to guide the cards between these elements;

FIGURE 6 is a side elevational view, substantially on the line 6—6 of FIGURE 3, this view showing the relation between an assist wheel and the feed head, and the manner in which the assist wheel extends into a small slot in the magazine to assist in the feed of cards to and from the magazine;

FIGURE 7 is a perspective view of a mechanism which is supported over the transport medium and which serves to control the closure member at the end of the magazine to open that member when the magazine is in place, the assembly of FIGURE 7 also including a guide which aids in the proper guiding of the cards from the magazine to the transport medium, and vice versa;

FIGURE 8 is a side view of the assembly of FIGURE 7, partly in section, and showing the manner in which a rotatable type of solenoid moves an actuating arm in a vertical reciprocal manner, which arm engages a hole in the closure member of the magazine to open and close that member;

FIGURE 9 is a fragmentary perspective view showing in somewhat schematic form a control for moving the stack of cards into the magazine to permit the closure member to be closed, the view of FIGURE 9 being essentially a top view to show a control knob and a rod-like actuating arm, the arm extending through a slot in the supporting surface of the card holding station;

FIGURE 10 is a fragmentary perspective view of the control of FIGURE 9, taken essentially from the bottom of the supporting surface and showing the linkage between the control knob and the control rod; and FIGURE 11 is a sectional view substantially on the line 11—11 of FIGURE 10 showing further details of the linkage mechanism.

The data processing apparatus and system of FIGURE 1 is shown as including a transport medium such as a vacuum transporting drum 10. This drum is constructed, for example, in the manner described and claimed in copending application 600,975, which was filed July 30, 1956, in the name of Loren R. Wilson (now Patent No. 2,883,189). The drum is rotatably mounted on a table top 12 for clockwise rotation, and it is capable of exerting a vacuum pressure at its peripheral surface. It is by means of this vacuum pressure, that the information storage cards are held at spaced intervals on the peripheral surface of the drum for transportation from one station to another. Although drums such as the drum 10 are shown for transporting the cards, any other suitable transport means may be used and such transport means do not necessarily have to be movable. For example, stationary transport means such as disclosed in copending application Serial No. 730,102, filed April 22, 1958, in the name of Eric Azari et al.; and in copending application Serial No. 731,413, filed April 28, 1958, in the name of Eric Azari, may also be used.

A first transducing means 14 is mounted on the table top 12 and is positioned to be contiguous to the periphery of the drum 10. A second transducing means 16 may also be mounted on the table top 12. This second transducing means is positioned on the opposite side of the drum 10 from the transducing means 14, and the transducing means 16 is also positioned to be contiguous to the periphery of the drum. Each of the transducing means 14 and 16 may, for example, comprise a series of electro-magnetic write or read transducer heads. Each of these heads is positioned to sense and process a different row of data on each of the cards transported on the periphery of the drum 10 past its corresponding transducer means.

The transducer means 14 and 16, of course, are positioned to permit a card to be carried past their respective activated faces by the transport drum 10. Each of these transducer means serves to read data on the transported cards, or to write new data on the cards, as mentioned previously. Also, and as also mentioned, the type of transducer means corresponds to the particular type recording by which the information is stored on the different cards.

A first reversible card holding station indicated generally as 18 is positioned on the table top 12 at one side of the drum 10 between the transducing means 14 and 16. A second reversible card holding station 20 is also positioned on the table top 12, the station 20 being positioned on the opposite side of the drum 10 from the station 18.

The station 18 includes a stack head 22 and it includes a feed head 24. These heads may be constructed and controlled in a manner fully described in the copending application 645,639 (now Patent No. 2,969,979) referred to previously. Briefly, the stack head 22 is rotatable from a standby position to the right in FIGURE 1 (as illustrated) to an operative position in which its end is contiguous to the periphery of the drum 10. In its operative position, the stack head engages cards transported on the drum and causes such cards to be moved from the peripheral surface of the drum to be deposited in the station 18.

The feed head 24 is movable in a slot 28 from a standby position to the left in FIGURE 1, to its illustrated operative position in which it controls the feed of cards to the peripheral surface of the drum 10. This control is made through a vacuum pressure which the feed head exerts on the cards in the station, and which may be controllably interrupted. Such a feed head is described in detail in copending case 645,639 (now Patent No. 2,969,979) referred to above.

The station also includes a pick-off assembly 35 which may be constructed in the manner described and claimed in copending application 733,132, filed May 15, 1958, in the name of Eric Azari et al (now Patent No. 2,954,226). The pick-off 35 serves to facilitate the stacking of cards in proper sequence in the station 18 under the control of the stack head 22.

Copending application 645,639 (now Patent No. 2,969,979) also fully describes the manner in which the feed head 24 and the stack head 22 may be moved between their standby and operative positions. Because the actual control and operation of the feed head and the stack head form no part of the present invention, it is believed unnecessary to describe in detail the manner in which these heads are controlled. It is believed sufficient at this point to state that the heads may conveniently be controlled by mounting them on appropriate levers and by providing a cam control for the levers. Such a control is described in the copending application 645,639 (now Patent No. 2,969,979), and it provides for one of the heads to be moved to its operative position as the other is moved to a standby position, and vice versa.

The card holding station 20 may also include a feed head 36 which is movable in a slot 38, and it may include a stack head 40 which is movable in a slot 42. The stack head 40 and feed head 38 may be similar to the corresponding heads 22 and 24 described in conjunction with the card holding station 18. The heads 36 and 40 may be controllably moved between their individual operative and standby positions in the same manner as described in the copending application 645,639 (now Patent No. 2,969,979). The station 20 may also include a lifter assembly 43, similar to the lifter 35 of the station 18.

The station 18 includes a pair of parallel guide grooves 44 and 46 formed in the table top 12 which constitutes the supporting surface of the station. These guide grooves extend outwardly from the periphery of the drum 10 and they are spaced from each other. A magazine 48 is adapted to be positioned in the card holding station 18 and is provided with a pair of depending portions 50 and 52 which are adapted to extend into respective ones of the guide grooves 44 and 46.

As best shown in FIGURE 4, for example, the magazine 48 may be constructed to have an open bottom, and it has a pair of sides 54 and 56, and a top 55, all of which may be formed of integral construction by appropriately bending a piece of sheet formed out of any suitable material. The lower extremity of the side 54 is fastened in a groove in the member 50, and the lower end of the side 56 is fastened in a similar groove in the member 52.

A pair of guide rails 58 and 60 are positioned in the table top 12 adjacent respective ones of the grooves 46 and 44 and extending parallel to these grooves. The guide rails 58 and 60 extend upwardly above the top surface of the table top 12 by a slight amount, and they have a tapered configuration to present a pair of thin guiding surfaces to the lower edges of the cards held in stacked relation in the magazine 48.

Similar guide members 62, 64, 66 and 68 are respectively mounted on the inner surface of the sides 54, the top 55 and the side 56 of the magazine. These latter guide members, in conjunction with the guide rails 58 and 60 serve as guiding surfaces for the cards so that the cards may be firmly retained in individual upright stacked positions when the magazine is in place and yet capable of being moved backwards or forward in the magazine without excessive frictional resistance.

Figure 2:
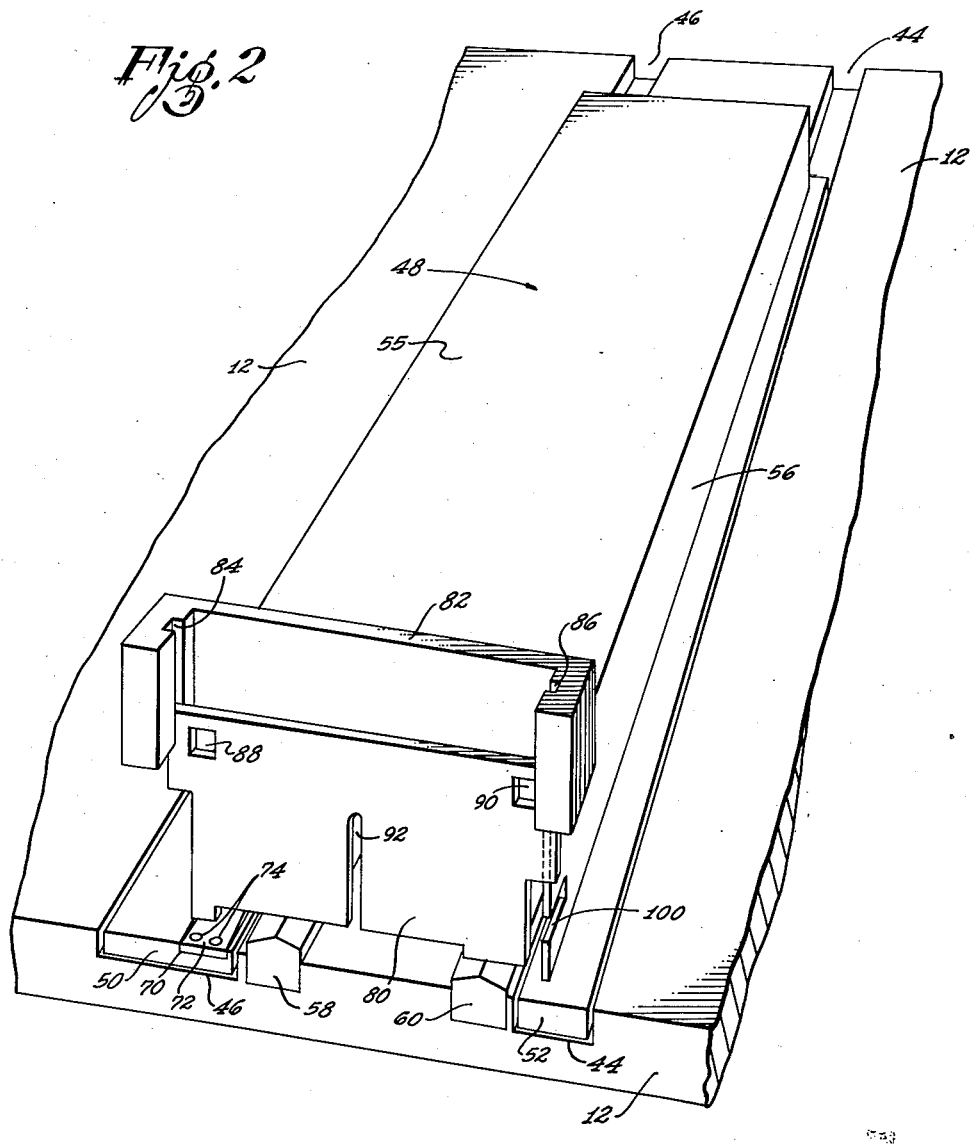
FIGURE 2 is a perspective view of the magazine portion of the card holding station of the invention, this view illustrating particularly a closure member for the forward end of the magazine, and appropriate guide means which permits the closure member to be moved between an open and a closed condition.

The member 50 includes a channel 70 which extends along it from one end to the other essentially parallel to the guide rail 58. A resilient spring strip 72 is secured at its forward end in the groove 70 by means, for example, of a pair of screws 74 (FIGURE 2). The strip 72 has tendency to curl up on itself, and its rear end engages the rear of the card stack in the magazine. This spring, therefore, serves as a biasing means which resiliently forces the card stack toward the forward end of the magazine.

The forward end of the magazine is normally enclosed by a closure member 80 (FIGURE 2). Therefore, the stack of cards in the magazine is resiliently biased by the spring strip 72 against this closure member. A guide bracket 82 is mounted on the top 55 of the magazine 48 at the forward end of the magazine, and this guide bracket has a pair of upwardly extending grooves 84 and 86 which receive the opposite edges of the closure member 80. The guide member permits the closure member 80 to be moved from a lower closed position to an upper open position. The closure member includes a pair of openings 88 and 90 which receive a corresponding pair of operating fingers, as will be described, which open or close the closure member 80 when the magazine is in place in the reversible station. The closure member 80 also includes a slot 92 which extends upwardly from its lower edge at a position essentially intermediate its side edges. The slot 92 permits a rod-like control to be removed from the magazine after that control has served (in a manner to be described) to move a stack of cards into the magazine to permit the closure member 80 to be closed.

The grooves 44 and 46 terminate at positions spaced from the periphery of the drum 10, so that when the magazine 48 is moved into place, it is arrested with its forward end facing the periphery of the drum 10 but spaced from that periphery. The magazine 48 is arrested at this spaced position, to permit the feed head 24 and the stack head 22 to be moved between their standby and operative positions without any interference from the magazine 48 and without the need to provide excessively large openings in the magazine to receive these heads.

A small slot is formed at the leading edge of the side 56, and this slot is designated 100 in FIGURES 2 and 5. A guide member 102 is positioned on the table top 12 adjacent the side 56 of the magazine and extending from the leading edge of that side to the periphery of the drum 10. This guide member has a tapered tongue portion 104 (FIGURE 5) which extends into the slot 100 in an inter-leaved relationship with the inner surface of the side 56, as best shown in FIGURE 3. The inner surface of this tongue portion 104 cooperates with the inner surface of the side 56 to present a smooth guiding surface for the cards from the forward end of the magazine 48 and along the inner surface of the guide member 102.

When the magazine 48 is moved into place in the position shown in FIGURE 1, for example, and when the feed head 24 is moved to its illustrated operative position and the stack head retracted to its illustrated standby position, the opening of the closure member 80 causes the spring strip 72 to move the stack of cards out of the magazine 48 and into the space between the forward end of the magazine and the periphery of the drum 10. The left hand edge of each card so moved engages a surface 24a of the feed head 24 (FIGURE 3), and the right hand edge of each card engages the inner surface of the guide member 102. The cards are therefore maintained in their same upright stacked condition as they are so moved through the forward end of the magazine 48 from the magazine to the space between it and the transport drum 10. The lead card in the stack then is moved against the face 24b of the feed head 24, and this face engages the trailing portion of the front surface of the lead card. The leading portion of the front surface is forced against the periphery of the drum 10. As fully described in the copending application 645,639 (now Patent No. 2,969,979), a vacuum pressure is established at the face 24b of the feed head which is sufficient to overcome the vacuum pressure exerted on the card by the transport drum 10.

The guide member 102 also has a tongue portion 106 (FIGURES 3 and 5), and which extends into close proximity with the periphery of the drum 10. The tongue portion 106 defines a throat with the periphery of the drum 10, and the transverse dimensions of this throat are such that one card at a time only can be passed through it for transport by the drum 10. Then, whenever the vacuum pressure at the surface 24b of the feed head 24 is removed, the lead card is swept by the drum 10 through the throat defined by the tongue 106. In this manner, cards may be controllably fed from the card holding station 18 to the periphery of the transport drum 10.

As shown in FIGURES 1 and 6, an assist wheel 110 is suspended over the feed head 24, and this assist wheel extends through a slot 112 in the side 54 of the magazine 48 into engagement with the left hand edges of the cards held in the magazine. As fully described in copending application 665,496, filed June 13, 1957, in the names of Alfred Gray et al. (now Patent No. 2,956,800), this wheel is rotatably driven by appropriate driving means (not shown) to move the trailing edges of the cards away from the drum 10 when the station 18 is in a stacking mode to assist in the depositing of cards from the drum 10 without jamming into the station 18. This wheel also serves to maintain the cards in a proper orientation when the station is in its feeding mode illustrated in FIGURE 1. As will be more apparent from the subsequent discussion, the assist wheel 110 also helps to move the cards between the magazine 48 and the space between the magazine and the drum 10.

When the magazine 48 is moved into the position shown in FIGURE 1 in the card holding station 18, it is moved against the mechanism shown in FIGURES 7 and 8. This mechanism is not shown in FIGURE 1, so that the other components in the card holding station may be more clearly shown in FIGURE 1. The assembly of FIGURES 7 and 8 is supported on a U-shaped bracket 120 which is supported on the table top 12 by means of a plurality of screws such as the screws 122. The bracket 120 extends over the top of the drum 10 and across the mouth of the station 18. The edge 124 of the bracket 120 faces the forward end of the magazine 48, when the magazine is moved into position in the card holding station 18. This edge 124 has an L-shaped guide bracket 126 secured to it by means, for example, of screws such as the screws 128. The guide bracket 126 extends across the space between the forward end of the magazine 48 and the peripheral edge of the drum 10. The lower surface of the guide bracket 126, as well as the lower surface of the bracket 120, cooperate to guide the upper edges of the cards from the magazine 48 into position in the space between the forward end of the magazine and the periphery of the drum. The cards in this space are supported, therefore, on the guide rails 58 and 60 between the feed head 24 and the guide member 102, and below the guide bracket 126 and the bracket 120.

A rotary-type solenoid 130 of known construction is supported by a bracket arm 132 at a position above the bracket 120, the arm 132 being secured to the bracket 120 by screws such as the screw 134 (FIGURE 7). The solenoid 130 has an operating arm 136, and this arm moves, for example, through a 45 degree arc from a lower angular position to an upper angular position when the solenoid is energized, and the arm returns to its lower angular position when the solenoid is de-energized. The arm 136 is coupled to a movable plate 138 through an appropriate coupling 140. The coupling 140 includes an L-shaped bracket 142 which is secured to the plate 138, and it includes a pin 144 which rotatably engages the free extremity of the solenoid arm 136.

The member 138 is slidably mounted between a pair of blocks 146 and 148 for vertical reciprocal motion, the blocks being fixed to the upper surface of the bracket 120 by any appropriate means. Each of these blocks has a plurality of bearings, such as the bearings 150, mounted on it. These bearings extend through slots in the member 138, and they permit the member 138 to be moved upwardly and downwardly with respect to the top surface of the bracket 120.

A plate 152 is secured in an upright position to the blocks 146 and 148 by a plurality of screws such as the screws 154. This plate 152 is supported by the blocks in a position facing the guide bracket 82 of the magazine 48 (FIGURE 2) when the magazine is in place in the position shown in FIGURE 1. The plate 152 has a pair of slots 156 and 158 extending in spaced parallel relationship from its lower edge. A pair of fingers 160 and 162 extend through corresponding ones of the slots 156 and 158, and these fingers are attached to the plate 138.

When the solenoid 130 is energized, its arm 136 rotates to move the plate 138 from its lower position to its upper position with respect to the bracket 120. This, in turn, causes the fingers 160 and 162 to move from their lower position to their upper position in their corresponding slots 156 and 158. When the solenoid 130 is de-energized, on the other hand, the fingers 160 and 162 return to their lower position in their slots.

The openings 88 and 90 in the closure member 80 (FIGURE 2) of the magazine 48 are positioned in respective axial alignment with the fingers 160 and 162 of FIGURE 7. Therefore, when the magazine 48 is moved into place in the position shown in FIGURE 1, the fingers 160 and 162 (which are normally in their lower position) extend into the corresponding openings 88 and 90 of the closed closure member 80. Then, when the solenoid 130 is energized to move the fingers 160 and 162 to their upper position, the fingers move the closure member to an open position, and the cards in the magazine are moved by the resilient strip 72, in the described manner, from the magazine into the space between it and the transport drum 10.

As best shown in FIGURE 8, the arm 136 of the solenoid 130 is affixed to the rotatable armature of the solenoid by means of a plurality of screws such as the screws 166.

When the station of FIGURE 1 is conditioned to its stacking mode, the stack head 22 is brought forward to the left in FIGURE 1 to its operative position and the feed head 24, at the same time, is retracted to the left in FIGURE 1 to its standby position. This control, as noted above, may be in accordance with the control mechanism described in the copending application 645,639 (now Patent No. 2,969,979). The stack head 22 is preferably constructed in the manner described in copending application Serial No. 715,926, filed February 18, 1958, in the name of Eric Azari et al., to have a central slot which receives the tongue 106 when the stack head is in its operative position so that the stack head may completely fill the throat formed by that tongue and the periphery of the drum 10 so as to arrest any card transported to it by the drum.

The pick-off member 35, as mentioned above, may be constructed in the manner explained in copending application 733,132 (now Patent No. 2,954,226). This pick-off serves fundamentally to hold the trailing edge of each card that has been arrested by the stack head 22 away from the periphery of the drum 10. This permits the next succeeding card to ride up over the pick-off 35 under the preceding card and assures that each card will be deposited in the station 48 in its proper sequence.

The cards transported to the station 18 when the station is in its stacking mode are deposited one after the other into the space between the forward end of the magazine 48 and the periphery of the drum 10. The closure member 80 is open at this time, so that as the stack of cards in this space grows, the cards are forced back into the magazine.

This stacking operation may be continued until all the cards that are to be deposited in the station 18 are in the magazine 48 and in the space between the forward end of the magazine and the periphery of the drum 10. Then, the actuation of a control knob 200 in FIGURE 1 causes an upright pin member or rod 202 to move in a slot 204 in the table top 12. The movement of this member is from the left in FIGURE 1 in front of the leading card in the stack which extends between the pick-off 35 and the stack head 22. This upright pin member 202 moves across the front face of the leading card, and as the rotation of the knob 200 is continued, the pin member 202 moves into a portion of the slot 204 which extends back into the magazine 48 to peel the leading card from the periphery of the drum 10.

Therefore, the rotation of the knob 200 causes the stack of cards in the space between the forward end of the magazine 48 and the periphery of the drum 10 to be moved as a unit back into the magazine 48 against the biasing force of the spring 72. The rotation of the knob 200 may also close a switch (not shown) which may be connected in an electrical circuit with the solenoid 130. This causes the solenoid 130 to be energized at the same time that the knob 200 becomes rotated so that the closure member 80 will become actuated to insure that the cards will move into the magazine. The closure member 80 may now be moved to its closed position by de-energizing the solenoid 130. The cards are now trapped in the magazine, and the pin member 202 may now be retracted back through the slot 92 in the closure member (as shown in FIGURE 2).

Although the control knob 200 is illustrated for purposes of convenience as being suitable for manual operation, it will be appreciated that the control of the rod-like member may be made through any suitable automatic control agency.

The control knob 200 and the rod-like member 202, together with their interconnecting linkage, are shown in FIGURES 9, 10 and 11. As shown in these figures, the knob 200 is secured to a control shaft 206 which extends through the table top 12. The control shaft 206 is rotatably mounted in a bracket 208 secured to the underside of the table top 12. The lower end of the shaft is fixed to an actuating arm 210 which extends across the underside of the table top from the bracket 208. The free end of the arm 210 is rotatably coupled to a corner of a triangular-shaped linkage member 212, the arm being so coupled to the linkage through a pair of bearings 214 and 216, as best shown in FIGURE 11. A second corner of the triangular linkage 212 rotatably supports a bearing 218 which extends into a guide groove 219 in the underside of the table top 12. The rod-like member 202 is secured to the third corner of the triangular member, and as described, this rod extends up through the slot 204 in the table top.

The guide groove 219 has a selected arcuate shape so that the rotation of the arm 210 by the actuation of the knob 200 about the axis of rotation of the shaft 206 causes the triangular linkage 212 to impart the desired motion to the rod-like member 202 in the slot 204. This motion, as described above, is first in an essentially tangential direction with respect to the periphery of the drum 10 to move along the lead card in the space between the magazine and the drum, and then in a radial direction away from the periphery of the drum 10 and into magazine 48 to move the stack of cards bodily through the forward end of the magazine and into the magazine. The pin 202 may also be positioned at the mouth of the magazine when it is first moved into place and then the pin may be retracted and moved out of the way to permit the stack of cards to move slowly out of the mouth of the magazine and against the drum.

A magazine of cards may, therefore, be placed in the station 18 of FIGURE 1, and the station conditioned to its feeding mode. This may be done simply and conveniently, merely by removing the desired magazine from the storage area and moving it into position in the station. Then, the energizing of the solenoid 130 causes the closure member 80 of the magazine to be moved to its open position so that the cards are moved from the magazine out to the space between its forward end and the periphery of the drum 10. The cards may then be controllably fed to the drum by interrupting the vacuum pressure at the face 24b of the feed head 24 at controlled times. The cards so transported on the drum are carried past the transducer means 14 at which information on the various cards is read, or new information may be written on the cards.

The station 20 may conveniently be placed in its stacking mode, so that the cards may be deposited in that station in the described manner. At the completion of the operation, the cards may be returned to the station 18 and they may be additionally processed by the transducer means 16 on their return. The cards in the station 18, or in the station 20, at the end of the operation may be shifted into the corresponding magazine by actuating the control knob, such as the control knob 200. Then, the solenoid 130 may be de-energized to close the closure member 80 and may be conveniently removed and replaced in the storage area.

The apparatus of FIGURE 1, of course, is intended merely to represent a simplified card processing apparatus in which the improved assembly and combination of the invention may be used.

It will be noted that the cards in the magazine 48 are almost completely enclosed in the magazine so that there is no danger of cards being susceptible to damage, or inadvertently falling from the magazine when it is removed from the station. The sides of the magazine have no excessively large openings formed in them, because there is no need to receive the stack head 22 or the feed head 24. The only openings in the magazine are one for the assist wheel 110 and one for the tongue 104 of the guide 102. Both these openings are relatively small and do not constitute any hazard for the cards in the magazine.

When the magazine is in place in the card holding station and the closure member is moved to its open position, the cards are smoothly shifted out into the space between the magazine and the drum, and they are supported on all edges by the described appropriate guiding surface as they are so shifted, so that there is no danger of any of the cards becoming misaligned or damaged. This enables the cards smoothly to be fed from the station and magazine to the transport drum and smoothly to be fed from the drum back into the magazine.

The invention provides, therefore, an extremely efficient card holding station which permits cards in stacked condition conveniently to be inserted in the station or removed from the station, and which provides for the immediate and efficient feed of the cards into or out of the apparatus when they are so placed in the station.

What is claimed is:

1. In apparatus for processing data on a plurality of information storage cards, the combination of: transport means for the cards, a removable magazine constructed to hold the information storage cards in a stacked relationship and disposable in spaced relationship to the transport means and including biasing means for urging the cards in the magazine toward the transport means and including closure means operative in a first position to maintain such cards in the magazine and operative in a second position to provide for a transfer of cards by the biasing means between the magazine and the space between the magazine and the transport means, and means operative upon the cards in the space between the magazine and the transport means and concurrently operative upon the closure means to obtain a movement of the cards into the magazine against the action of the biasing means and in accordance with the movement of the closure means from the first position to the second position.

2. In apparatus for processing data on a plurality of information storage cards, the combination of: transport means for the cards, a structure disposed to define a supporting surface for the cards and disposed relative to the transport means to facilitate the transfer of cards between the transport means and the structure, a removable magazine constructed and disposed relative to the supporting surface and to the transport means to maintain information storage cards in a stacked condition on the supporting surface and in spaced relationship to the transport means, biasing means disposed in coupled relationship to the cards in the magazine to urge the cards toward the transport means, and means operative on the cards on the supporting surface and in spaced relationship to the magazine at particular times to move the cards away from the transport means against the force of said biasing means and into said magazine.

3. In apparatus for processing data on a plurality of information storage cards, the combination of: transport means for the cards, a structure disposed to define a supporting surface for the cards and disposed relative to the transport means to facilitate the transfer of cards between the transport means and the supporting surface, a removable magazine disposed relative to the supporting surface and the transport means to maintain the information storage cards in a stacked condition on the supporting surface and within the magazine at first particular times, the removable magazine being disposed in spaced relationship to the trausport means for a disposition at second particular times of the cards between the transport means and the magazine and in cooperative relationship with the transport means to obtain a transfer of the cards to the transport means, a feed head positioned between the magazine and the transporting means and having an operative position in coupled relationship with the cards and disposed between the magazine and the transport means to obtain a controlled transfer of cards from the magazine to the transporting means, biasing means disposed relative to the cards on the supporting surface for urging cards in the magazine toward the transport means to maintain such cards in the space between said magazine and the transport means, and means included in the magazine and operative to release the cards for movement of the cards by the biasing means from their position within the magazine to the position between the magazine and the transport means for a controlled transfer of the cards to the transport means in the operative position of the feed head.

4. In apparatus for processing data on a plurality of information storage cards, the combination of: transport means for the cards, a magazine constructed to hold the information storage cards in a stacked relationship and including a closure member at one end and disposed relative to the transport means to hold the cards in the magazine, biasing means in the magazine for urging cards against the closure member, control means operative upon the closure member to open the closure member for a movement of the cards by the biasing means from the magazine into the space between the magazine and the transport means, means operative upon the cards in the space between the magazine and the transport means for obtaining a controlled transfer of such cards to the transport means, and means extending through the magazine toward the transport means for providing for an individual transfer of cards to the transport means from the space between the magazine and the transport means.

5. In apparatus for processing data on a plurality of information storage cards, the combination of: a card holder for holding the cards in stacked relationship, transport means disposed relative to the cards in the card holder to provide a transfer of cards to the transport means from the card holder and to provide a movement of the cards, a magazine movable to a position within the card holder and in spaced relationship to the transport means and constructed to hold the cards in stacked relationship within the magazine and including a closure member movable to first and second positions transverse to the stacked relationship of the cards wherein the closure member in the first position prevents a movement of cards out of the magazine and the closure member in the second position permits a transfer of cards between the magazine and the space between the magazine and the transport means, biasing means operative upon the cards in the magazine for urging the cards into the space between the magazine and the card holder, and means operative upon the closure member to move the member from the first position to the second position for a movement of the cards by the biasing means toward the transport means to obtain a transfer of such cards to the transport means.

6. In apparatus for processing data on a plurality of information storage cards, the combination of: transport means for the cards, a magazine constructed to hold information storage cards in a stacked relationship and disposed in spaced relationship to the transport means to hold cards between the transport means and the magazine, biasing means for urging the cards in the magazine toward the transport means to maintain such cards in the space between the magazine and the transport means, a feed head positioned adjacent one side of the magazine in the space between the magazine and the transport means and having an operative position relative to the cards in the space between the magazine and the transport means to obtain a flow of fluid through the feed head for a control over the transfer of cards to the transport means from the space between the transport means and the magazine, means operative upon the feed head in the operative position of the feed head to obtain an interruption in the flow of fluid through the feed head for a controlled transfer of cards to the transport means from the space between the transport means and the magazine means, means positioned at the other side of the magazine between the magazine and the transport means and extending through the magazine to define a throat with the transport means for obtaining an individual passage of cards to the transport means from the space between the magazine and the transport means, control means in the magazine for preventing a transfer of cards from the magazine into the space between the magazine and the transport means, and means operative upon the control means in the magazine to obtain a movement by the biasing means of the cards from the magazine into the space between the magazine and the transport means for a transfer of such cards to the transport means.

7. In apparatus for processing data on a plurality of information storage cards, the combination of: transport means for the cards, a removable magazine disposed in spaced relationship to the transport means and constructed to hold information storage cards in a stacked relationship and including biasing means for urging the cards in the magazine toward the transport means to maintain the cards in the space between the end of the magazine and the transport means for a transfer of cards between the magazine and the transport means, means including a stack head positioned adjacent one side of the magazine between the magazine and the transport means and disposed in an operative position relative to the cards on the transport means to obtain a transfer of cards from the transport means to the space between the transport means and the magazine, the magazine being constructed to cooperate with the transport means in one operative relationship in retaining the cards in the space between the magazine and the transport means and in a second operative relationship to provide for a transfer of cards into the magazine from the space between the magazine and the transport means, and means concurrently operative upon the magazine and upon the cards in the space between the magazine and the transport means for obtaining an operation of the magazine in the second relationship and for controllably moving the cards in the space between the magazine and the transporting means into the magazine against the force of the biasing means.

8. The combination defined in claim 7 in which said last named moving means includes a rod-like member disposed in the space between the magazine and the transport means and having a configuration to engage the faces of the cards in the space between the magazine and the transport means and movable in a direction to move the cards into the magazine.

9. In apparatus for processing data on a plurality of information storage cards, the combination of: transport means for the cards, a removable magazine for holding information storage cards in a stacked relationship and disposed in spaced relationship to the transport means to hold the cards between the magazine and the transport means and including closure means operative in a first position to maintain the cards within the magazine and operative in a second position to provide for a transfer of cards between the magazine and the space between the transport means and the magazine, biasing means operative upon the cards for urging the cards in the magazine toward the transport means to maintain such cards in the space between the magazine and the transport means, means operative upon the closure member for positioning the closure member in the second relationship to obtain a movement of the cards into the magazine from the space between the magazine and the transport means, and means operative upon the cards in the second positioning of the closure member for controllably moving the stack of cards into the magazine from the space between the magazine and the transport means against the force of said biasing means.

10. The combination set forth in claim 9 in which the last mentioned means includes means initially movable to a position between the transport means and the magazine for disposition against the cards and subsequently movable toward the magazine for movement of the cards into the magazine.

11. In apparatus for processing data on a plurality of information storage cards, the combination of: transport means for the cards, a magazine for holding the cards in stacked relationship and disposed in spaced relationship to the transport means to hold cards between the magazine and the transport means, a feed head movable to an operative position relative to the cards in the space between the magazine and the transport means for a transfer of cards to the transport means and movable to a standby position away from such cards and disposed between the transport means and the magazine to prevent any interference by the magazine on the feed head in the standby and operative positions of the feed head, a stack head movable to an operative position relative to the cards on the transport means for a transfer of such cards into the space between the magazine and the transport means and movable to a standby position away from such cards and disposed between the transport means and the magazine to prevent any interference by the magazine on the stack head in the standby and operative positions of the stack head, means operative upon the feed head and the stack head to obtain a movement of the feed head to the operative position and a concurrent movement of the stack head to the standby position at particular times and to obtain a movement of the feed head to the standby position and a concurrent movement of the stack head to the operative position at other times, biasing means operative upon the cards in the magazine to obtain a movement of such cards into the space between the magazine and the transport means for a transfer of such cards to the transport means, the magazine being constructed to retain cards in the space between the transport means and the magazine in a first operative relationship and to provide for a movement of cards into the magazine from the space between the magazine and the transport means in a second operative relationship, and means operative upon the cards in the space between the feed head and the stack head and concurrently operative upon the magazine to obtain an operation of the magazine in the second relationship and to obtain a movement of such cards into the magazine against the action of the biasing means.

12. In apparatus for processing data on a plurality of information storage cards, the combination of: transport means for the cards, a magazine disposed in spaced relationship to the transport means and provided with a closure member operative in a first position to hold the cards in stacked relationship within the magazine and operative in a second position to obtain a movement of cards between the magazine and the space between the magazine and the transport means, a feed head coupled in a first position to the cards in a space between the magazine and the transport means to provide a controlled transfer of cards from this space to the transport means and disposed in a second position out of coupled relationship with the cards in the space, a stack head coupled in a first position to the cards on the transport means to obtain a transfer of cards from the transport means to the space between the magazine and the transport means and disposed in a second position out of coupled relationship with the cards on the transport means, actuating means coupled to the feed head and to the stack head and operative on a cyclic basis to pivotally move the feed head from the second position to the first position and the stack head from the first position to the second position on a synchronized basis in one cycle and to pivotally move the feed head from the first position to the second position and the stack head from the second position to the first position on a synchronized basis in a second cycle, biasing means operative upon the cards in the second position of the closure member for moving the cards into the space between the magazine and the transport means, means including a movable member operative upon the cards in the space between the magazine and the transport means and in the second position of the closure member to obtain a movement of such cards into the transport means, and means operative upon the closure member upon a return of the cards into the magazine for moving the closure member to the first position.

13. In apparatus for processing data on a plurality of information storage cards, the combination of: transport means for the cards, a magazine disposed in spaced relationship to the cards and including a closure member disposable in a first position to hold the cards in stacked relationship within the magazine and disposable in a second position to provide for a movement of cards between the magazine and the space between the magazine and the transport means, means operative upon the closure member to produce a disposition of the closure member in the second position, and means including a rod-like member operative upon the cards in the second position of the closure member and in the disposition of the cards in the space between the transport means and the magazine and initially movable along the card contiguous to the transport means to a position for engaging the card and subsequently movable in a path away from the transport means and toward the magazine to move the cards into the magazine.

14. In apparatus for processing data on a plurality of information storage cards, the combination of: transport means for the cards, a removable magazine disposed in spaced relationship and constructed to hold the cards in stacked relationship between the magazine and the transport means and provided with a closure member movable between first and second positions in a direction transverse to the stacked relationship of the cards for a movement of the cards between the magazine and the space between the magazine and the transport means in the first position of the closure member and for a disposition of the cards in the magazine in the second position of the closure member, means operative upon the closure member to obtain a movement of the closure member to the first position, and means operative upon the cards in the first position of the closure member and including a member movable initially along the face of the card contiguous to the transport means and movable subsequently in a direction corresponding to the stacked relationship of the cards for a transfer of the cards between the magazine and the space between the magazine and the transport means.

15. In apparatus for processing data on a plurality of information storage cards, the combination of: a station for holding the cards in stacked relationship, movable transport means disposed relative to the cards in the station to provide a transfer of cards between the transport means and the station and to provide a movement of cards with the transport means, a magazine movable within the station to a position spaced from the transport means for a retention of cards between the magazine and the transport means and including a closure member movable between first and second positions in a direction transverse to the stacked relationship of the cards in the station, a groove formed in the station at a position near the transport means and provided with a first portion extending in a direction corresponding to the stacked disposition of the faces of the cards in the station and provided with a second portion extending toward the magazine in a direction transverse to the first portion, a rod disposed in the groove and having a portion engaging the faces of the cards, driving means operative upon the rod to obtain a movement of the rod along the first and second portions of the groove for a movement of the cards toward the magazine, and means operative upon the closure member to obtain a movement of the closure member to a first position for a transfer of cards into the magazine upon a movement of the rod along the first and second portions of the groove.

16. In apparatus for processing data on a plurality of information storage cards, the combination of: transport means for the cards, a magazine disposed in spaced relationship to the transport means and including a closure member movable between first and second positions, the magazine being constructed in a first position of the closure member to hold the cards in a stacked relationship within the magazine and in a second position of the closure member to provide for a movement of the cards between the magazine and the space between the magazine and the transport means, a support structure for the cards, a guide groove provided in the support structure and having a first portion extending laterally between the magazine and the transport means at a position near the transport means and having a second portion extending from the first portion away from the transport means and toward the magazine, a rod movable in the groove and having a portion for engaging the cards to initially slide along the cards in the first portion of the groove and to move the cards into the magazine in the second portion of the groove, means operative upon the closure member to move the closure member into the second position, and linkage means coupled to the rod in an eccentric relationship and operative upon the rod to move the rod along the first and second portions of the groove for a movement of the cards into the magazine.

17. Apparatus as set forth in claim 16 in which the magazine is provided with a slot to receive the rod during the movement of the cards into the magazine and in which the closure member is provided with at least one opening and in which the means operative upon the closure member includes a finger extending into the opening and includes electrically actuated means operative upon the finger to obtain a movement of the closure member.

18. In apparatus for processing data on a plurality of information storage cards, the combination of: transport means for the cards, a support member for the cards, a magazine disposed in spaced relationship to the cards and including a closure member disposable in a first position to hold the cards in a stacked relationship on the support member within the magazine and disposable in a second position to provide for a movement of cards on the support member between the magazine and the space between the magazine and the transport means, the closure member being movable to the first and second positions in a direction transverse to the support member and being provided with at least one opening, a finger extending through the opening in the closure member to produce a movement of the closure member in accordance with the movements of the finger, a solenoid coupled to the finger and operative upon becoming energized to produce a movement of the finger for a movement of the closure member into the second position, and means operative upon a movement of the closure member to the second position to obtain a movement of the cards between the magazine and the space between the magazine and the transport means.

19. In apparatus for processing data on a plurality of information storage cards, the combination of: transport means for the cards, a removable magazine constructed to hold the information storage cards in a stacked relationship within the magazine and disposed in spaced relationship to the transport means for maintaining the cards in stacked relationship in the space between the magazine and the transport means and having a slot formed in a first side and provided with a movable closure member operative upon the cards in the magazine, biasing means operative upon the cards in a first particular position of the closure to move the cards into the space between the magazine and the transport means, means operative upon the closure member to obtain a movement of the closure member into the first particular position for movement by the biasing member of the cards into the space between the magazine and the transport means, and a member positioned adjacent the first side of the magazine and extending into the slot in the magazine and rotatable in a direction for engaging the ends of cards in the space between the transport means and the magazine to assist in the movement of cards from the magazine into the space between the magazine and the transport means.

20. In apparatus for processing data on a plurality of information storage cards, the combination of: transport means for the cards, a removable magazine constructed to hold the information storage cards in a stacked relationship within the magazine and disposed in spaced relationship to the transport means for maintaining the cards in stacked relationship in the space between the magazine and the transport means and having a slot formed in a first side and provided with a closure member operative upon the cards in the magazine and movable to a first particular position for a movement of the cards between the magazine and the space between the magazine and the transport means, means operative upon the closure member to obtain a movement of the closure member into the first particular position for movement of the cards between the magazine and the space between the magazine and the transport means, means operative upon the cards in the first particular position of the closure member for obtaining a movement of the cards between the magazine and the space between the magazine and the transport means, and a member positioned adjacent the first side of the magazine and extending into the slot in the magazine and rotatable in a direction for engaging the ends of the cards in the space between the magazine and the transport means to assist in the movement of cards between the magazine and the space between the transport means and the magazine.

21. The apparatus as set forth in claim 20 in which the card moving means includes a member initially movable along the cards in the space between the transport means and the magazine and subsequently movable toward the magazine to produce a movement of the cards into the magazine and in which the assisting member is rotatable in a direction to assist a movement of the cards into the magazine.

22. In combination in apparatus for processing a plurality of cards, transport means for the cards and constructed to retain the cards for movement, first means disposed relative to the cards on the transport means to obtain a displacement of the leading ends of the cards from the transport means, second means disposed relative to the cards on the transport means at a particular position with respect to the first means to obtain a displacement from the transport means of the trailing ends of the cards having their leading ends displaced from the transport means and to retain the middle portions of the cards on the transport means, and third means operatively coupled to the cards having their trailing ends displaced from the transport means to obtain a displacement of the middle portion of the cards from the transport means.

23. In combination in apparatus for processing a plurality of cards, transport means for the cards, a pick-off member disposed relative to the transport means to obtain a movement of each card in the plurality from the transport means and along the pick-off member and back to the transport means, first means disposed relative to the cards on the transport means and in spaced relationship to the pick-off member to interrupt the movement of the cards on the transport means and to obtain a disposition of the trailing ends of such cards on the pick-off member and in spaced relationship to the transport means, and second means disposed relative to the pick-off member and the first means and constructed to engage each card for a decoupling of the card from the transport means and movable in a path to initially engage the trailing end of each card having its movement interrupted by the first means and to decouple from the transport means successive positions on the card toward the leading end of the card for a transfer of the card from the transport means.

24. In combination in apparatus for processing a plurality of cards, transport means for the cards, a station for the cards and provided with a pair of spaced walls to retain the cards in stacked relationship, stacking means disposed relative to the station to obtain a transfer of cards from the transport means to the station, a pick-off member for the cards and disposed in contiguous relationship to the transport means to obtain a movement of each card in the plurality along the pick-off member and back to the transport means, the pick-off member being disposed relative to the station at an intermediate position between the walls of the station, and movable means disposed relative to the pick-off member for movement relative to the pick-off member in a particular path to engage the trailing portion of the card on the transport means upon an initial movement of the movable means relative to the pick-off member and to strip the card from the transport means and guide the card into the station upon a further movement of the movable means relative to the pick-off member.

25. In combination in apparatus for processing a plurality of cards, transport means movable in closed loops and constructed to retain the cards in fixed positioning on the transport means for movement with the transport means, means including a stacking member disposed in coupled relationship to the cards on the transport means to obtain a displacement of the front ends of the cards from the transport means, means including a pick-off member disposed in coupled relationship to the cards on the transport means at a position displaced from the stacking member in a direction opposite to the direction of movement of the cards with the transport means to obtain a displacement of successive portions of the card from the transport means and a subsequent return of such successive portions of the cards to the transport means during the movement of the cards with the transport means, the pick-off member being disposed relative to the stacking member to obtain a displacement of the rear ends of the cards from the transport means when the front ends of the cards are displaced from the transport means by the stacking member, and means operatively coupled to the cards having their trailing ends displaced from the transport means by the pick-off member and movable in a particular path relative to the cards to strip the cards from the transport means and to obtain a movement of the cards in a direction away from the transport means.

26. The combination set forth in claim 25 in which a station is provided with first and second walls and in which the station is constructed to receive the cards stripped from the transport means and to hold the cards in stacked relationship and in which the stacking member is disposed near the first wall of the station and in which the pick-off member is disposed between the first and second walls of the station.

27. In combination, transport means constructed to obtain a transport of a plurality of cards, a magazine disposed in spaced relationship to the transport means and constructed to retain the cards in stacked relationship, a member movable between the transport means and the magazine and constructed to obtain a movement of the cards in the plurality with the member into the magazine from the space between the magazine and the transport means upon a movement of the member along a particular path in a direction away from the transport means, means defining the particular path of movement of the member between the transport means and the magazine, and means providing a movement of the member along the particular path.

28. In apparatus including transport means constructed to obtain a transport of a plurality of cards and including a magazine disposed in spaced relationship to the transport means and constructed to retain the cards in stacked relationship, the combination of: a support table disposed in contiguous reationship to the transport means, there being in the table a groove having a first portion extending in a direction substantially parallel to the transport means at a position contiguous to the transport means and having a second portion communicating with the first portion and extending in a direction transverse to the transport means, a rod movable in the groove initially to strip a particular card in the plurality from the transport means during the movement of the rod in the first portion of the groove and to move the card away from the transport means during the movement of the rod in the second portion of the groove, and means coupled to the rod for obtaining the movement of the rod in the first and second portions of the groove.

29. The combination set forth in claim 28 in which a pick-off member is disposed in coupled relationship to the transport means at a position in the path of movement of the rod in the first portion of the groove to hold a first end of the particular card in the plurality away from the transport means and to obtain a movement of the rod between the first end of the particular card and the transport means in the first portion of the groove.

30. In combination in apparatus for processing a plurality of cards, transport means for the cards, magazine means including a wall disposed in spaced relationship to the transport means and movable between first and second positions and operative in the first position to retain the cards in stacked relationship within the magazine means and operative in the second position to provide for a transfer of cards between the transport means and the space between the wall and the transport means, means operatively coupled to the wall for obtaining a movement of the wall to the first position at first particular times and for obtaining a movement of the wall to the second position at second particular times, means operatively coupled to the cards in the plurality for obtaining a transfer of the cards into the space between the wall and the transport means upon first particular movements of the wall to the second position, and means operatively coupled to the cards in the plurality for obtaining a movement of the cards away from the space between the wall and the transport means upon second particular movements of the wall to the second particular position.

31. In combination in apparatus for processing a plurality of cards having a planar disposition wherein such apparatus includes transport means for the cards, station means disposed relative to the transport means and constructed to hold the cards in the plurality in stacked relationship within the station means in a first operative relationship and to provide in a second operative relationship for a movement of all of the cards in a direction transverse to the transport of the cards by the transport means past the station means and transverse to the planar disposition of the cards in the station means and into a position contiguous to the transport means, the station means being stationary in a direction trasverse to the planar disposition of the cards in the station means during the change from the first operative relationship of the station means to the second operative relationship of the station means, means operatively coupled to the station means to obtain the second operative relationship of the station means at particular times for a movement of all of the cards into contiguous relationship with the transport means, and means operatively coupled to the cards in the station means and responsive to the second operative relationship of the station means to produce a movement of all of the cards into contiguous relationship with the transport means.

32. In combination in apparatus for processing a plurality of cards having a planar disposition wherein such apparatus includes transport means for the cards, station means disposed in coupled relationship to the transport means and constructed to hold the cards in the plurality in stacked relationship within the station means in a first operative relationship and to provide in a second operative relationship for a movement of all of the cards away from the transport means in a direction transverse to the transport of the cards by the transport means past the station means and transverse to the planar disposition of the cards in the station means to inhibit the further transfer of cards between the station means and the transport means while maintaining the station means stationary in the transverse direction, the station means being stationary in a direction transverse to the planar disposition of the cards in the station means during the change between the first and second operative relationships of the station means, means operatively coupled to the station means to obtain the second operative relationship of the station means at particular times for a movement of all of the cards into the station means from a position in contiguous relationship with the transport means, and means operatively coupled to the station means and responsive to the operation of the station means in the second relationship to produce a movement of all of the cards into the station means from a position in contiguous relationship with the transport means.

33. In combination for use with a plurality of cards, transport means constructed to obtain a transport of the cards in the plurality, a magazine disposed in spaced relationship to the transport means and constructed to retain the cards in stacked relationship, a supporting table for holding the cards, there being in the table a groove extending from the transport means toward the magazine, and a rod movable in the groove in the supporting table to obtain a transfer of the cards into the magazine from the space between the transport means and the magazine.

References Cited in the file of this patent
UNITED STATES PATENTS

| | | |
|---|---|---|
| 1,466,161 | Gunderson | Aug. 28, 1923 |
| 2,680,614 | Gibson | June 8, 1954 |
| 2,883,188 | Gray et al. | Apr. 21, 1959 |
| 2,883,189 | Wilson | Apr. 21, 1959 |
| 2,901,247 | Orner | Aug. 25, 1959 |
| 2,905,465 | Armstrong | Sept. 22, 1959 |
| 2,954,226 | Azari et al. | Sept. 27, 1960 |